March 24, 1964   P. THOMÉ   3,125,804
WELDING PROCESS AND EQUIPMENT
Filed Feb. 24, 1961   2 Sheets-Sheet 1
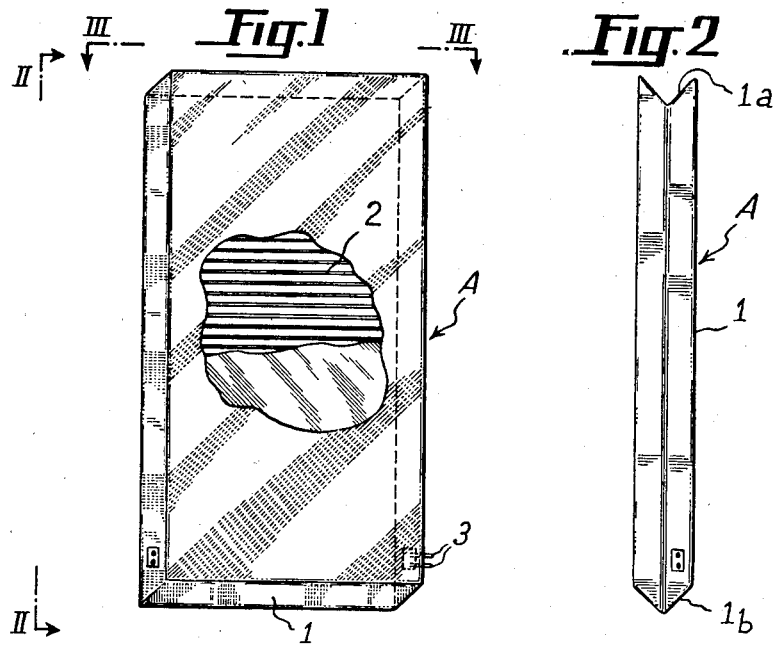
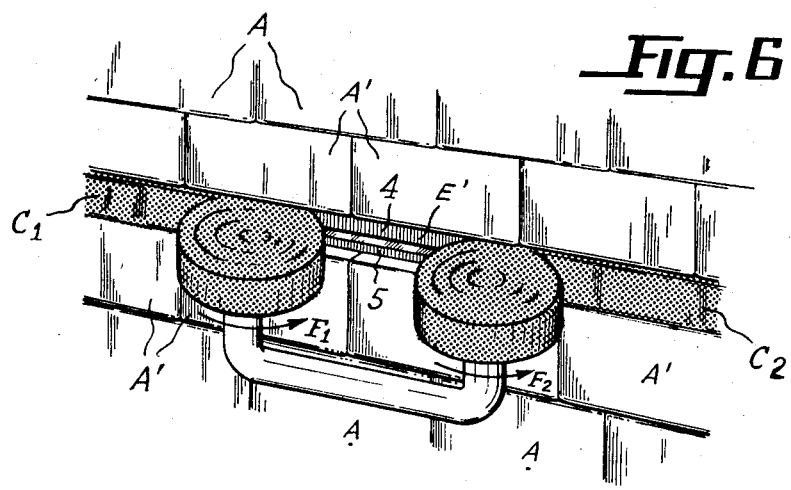
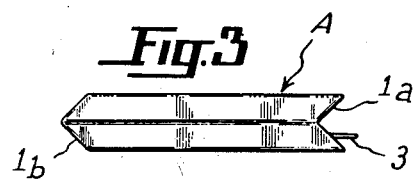
INVENTOR
PAUL THOMÉ
BY
Bacon & Thomas
ATTORNEYS March 24, 1964
P. THOMÉ
3,125,804
WELDING PROCESS AND EQUIPMENT
Filed Feb. 24, 1961
2 Sheets-Sheet 2
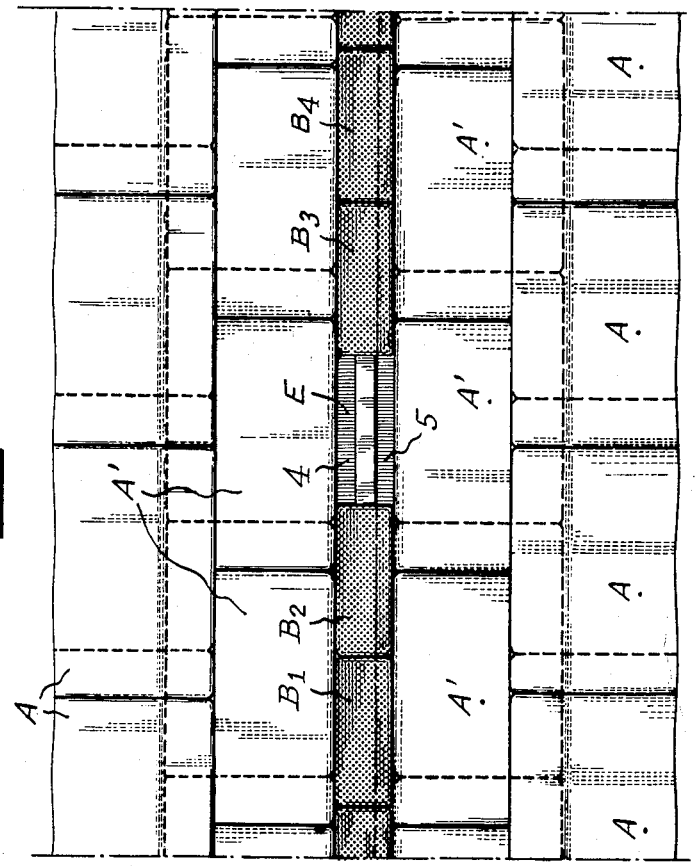
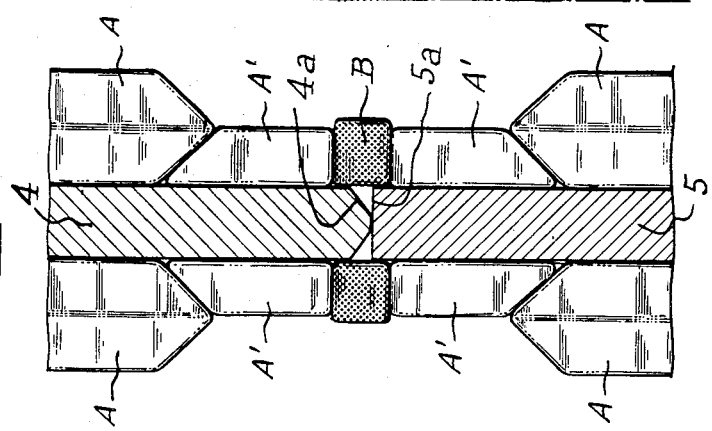
INVENTOR
PAUL THOMÉ
BY
Bacon & Thomas
ATTORNEYS

United States Patent Office 3,125,804
Patented Mar. 24, 1964

3,125,804
WELDING PROCESS AND EQUIPMENT
Paul Thomé, Saint-Cloud, France, assignor to Commissariat a l'Energie Atomique, a society of France
Filed Feb. 24, 1961, Ser. No. 91,395
Claims priority, application France Feb. 25, 1960
6 Claims. (Cl. 29—487)

This invention relates to welding procedure, being especially concerned with the means for maintaining the work adjacent the weld at a prescribed temperature before, during and/or after the welding operation.

In the manufacture of welded assemblies especially in cases where the work to be welded is of large dimensions and gauge thickness, it is important that the work be preheated to a suitable temperature (say in a range of from 250 to 350° C.) adjacent the weld in order to avoid the creation of excessive temperature gradients liable to result in tensions and cracks on cooling of the welded seam. In many cases moreover it is current practice to subject the work on completion of the weld, and sometimes during the actual welding process, to a high-temperature annealing treatment, in the range of about 600° C., for thoroughly relieving any internal tensions set up in the metal or preventing such tensions from arising. The above heat treatments take on especial importance in cases where the work is of large dimensions and/or of complicated contour, and/or where the welding is performed by means of electric arcs of relatively low energy content per unit length of weld. In such cases it would be very desirable that the heating be effected continuously, with the pre-heating step merging into the annealing or post-heating treatment without allowing the work to cool down to ambient temperature in between.

The heat treatments accompanying welding operations of the character described above are currently performed by various means including gas heaters, resistance heaters or panels, induction coils and the like. Generally, the heater means used, whatever their precise character, are spaced from the surface of the work and act mainly by radiating heat on to the work from a distance. This has resulted in the requirement that the heater means be brought to temperatures considerably in excess of the temperatures required to be established in the work, with consequent waste of power. Moreover, the high-temperature radiating heater means have often created difficult or painful working conditions for the welder and in many cases it was impossible to heat the work to the high temperature ranges that would otherwise have been desirable for optimum welding results since physiologically intolerable operating conditions would then be created. Moreover, the conventional heating equipment, is not well suited for use in work sites where cramped conditions prevail, and/or where it might be unsafe or otherwise objectionable to dissipate considerable amounts of heat by radiation into the surrounding areas.

Objects of this invention are to provide improved heating equipment for use in welding operations which will possess part or all of the following advantages over conventional equipment for the same purpose: Minimum consumption of power for establishing given temperature conditions within the work; greatly reduced dissipation of heat into the surrounding area thereby correspondingly improving physiological working conditions for the welder as well as eliminating other hazards or inconveniences that may frequently accompany the generation of large amounts of heat; greatly increased all-around convenience and safety in use; greater temperature uniformity in the work than heretofore attainable, with consequent improvement in the characteristics of the resulting weld; ideal continuity in heat treatment of the work throughout a welding process.

Another object is to provide improved heater means for use in a welding process whereby both opposite faces of large sized metal sheet or plate work to be welded can be conveniently heated before, during and after a welding operation.

A broad object also is to provide an improved welding process especially suited for the formation of weld seams between metal plates or sheets of large surface and/or thickness dimensions, both of flat and curved configuration.

In accordance with an aspect of the invention there is provided heater apparatus for use in a welding process which comprises a set of generally similar and rectangular heater pad elements, electric resistor or the like heater means enclosed within said elements and means for connecting the electric means with an external power supply, and means for supporting a plurality of said pad elements in contiguous relation over a large continuous area on each side of the welded work adjacent the weld.

The invention also includes, in a welding process, the steps of completely covering continuous areas on both opposite sides of the welded work with electric heater pads in direct engagement with the work surface, energizing said heater pads to preheat the work, progressively uncovering successive regions on one side of the work along the path of a welded seam to be formed therein, forming successive portions of the welded seam in the uncovered region and progressively re-covering said areas after formation of the seam portion therein.

Exemplary embodiments of the invention will now be described for purposes of illustration but not of limitation with reference to the accompanying drawings, wherein:

FIG. 1 shows a plan view of a heater pad for use in a welding process according to the invention, with its casing partly torn open to disclose the interior thereof, FIG. 2 is a view on line II—II of FIG. 1, FIG. 3 is a view on line III—III of FIG. 1, FIG. 4 is a view taken transversely to the work showing a pair of metal sheets to be welded edge-on and heater apparatus according to a form of the invention associated with the work during welding operations, FIG. 5 is a corresponding view taken on a plane normal to that of FIG. 4 and from the front of the work, FIG. 6 is a partial view somewhat similar to FIG. 5 but illustrating a modified form of the invention.

Shown in FIGS. 1, 2 and 3 of the drawings is a heater pad forming one element of heater apparatus for a welding process according to a preferred embodiment of the invention. The pad comprises a generally rectangular or box-shaped casing 1 made of flexible heat-resistant sheet material and filled with a mass of yielding heat resistant material having good insulation characteristics for heat and electric current, such as silica wool kieselguhr or the like. Imbedded in this filler mass is an array of electric heater resistors 2 of conventional type, connected through means not shown with a pair of terminals 3 supported on the casing for connection with a power supply.

The side edges of the pad element are formed with complementary internesting contours to permit quick and easy interengagement of all four sides of the pad with corresponding sides of four other identical pads. As shown for this purpose, see especially FIGS. 2 and 3, one long side and one short side of the heater pad A are each formed with a projecting angular or herringbone contour as shown at 1b, while the other long side and the other short side of the pad are each formed with a reentrant angular or herringbone contour as shown at 1a. It will be understood that any other suitable interengaging configurations may be used if preferred.

The embodiment of the invention being described was primarily designed for use in the welded assemblage of large sized nuclear reactor tanks in which the gauge thickness of the sheeting to be welded is of the order of 15 centimeters. For this class of applications, the heater pads such as A were made with a depth or thickness dimension of about 30 centimeters. When using silica wool as the filler material, wherein the heat conduction rate is about $0.35 \times 10^{-4}$ joules per centimeter per second, the thickness dimension just indicated for the pads is found sufficient to limit the heat losses to the surrounding atmosphere to an amount of the order of a few hundred watts per square meter area. It will thus be apparent that when an array of heater pads such as A, FIG. 1, is placed in contiguous relation with the complementarily formed side edges of adjacent pads interengaged, so as to cover a large continuous area of the metal sheeting, there is only a minimum degree of dissipation of the heat generated within each pad to the surrounding atmosphere. This not only results in an appreciable saving on the power consumed for a given welding assemblage, but, perhaps even more important, makes it possible to heat the work to a degree that was not practically feasible with prior weld heating arrangements with which a large fraction of the generated heat was inevitably dissipated and tended to produce intolerably hot working conditions for the welders. Thus in particular, the novel heating equipment of the invention makes it practical, probably for the first time, to apply heat to large continuous areas on both opposite faces of the metal sheeting, thereby creating within the mass of metal extremely uniform temperature conditions not heretofore attainable and correspondingly improving the mechanical and physical characteristics of the final welded assembly.

Referring to FIGS. 4 and 5, the use of heating apparatus according to the invention during the formation of a welded seam between two end-on-metal sheets is illustrated. The two sheets to be welded together are shown at 4 and 5 and the abutting edge or sheet 4 is shown chamfered on both sides so as to provide for the forming of two opposite welded seams between the surfaces 4a and 5a on each side of the assembly.

As shown two arrays of heater pads A each similar to the pad shown in FIGS. 1–3 are arranged on each side of the work assembly, in the internesting relationship described. On each side of the assembly, the two rows of pads A are spaced from each other all along the path of the proposed seam, and the intervening gap thus defined is filled by additional heater pad means which are more readily removable and insertable than the main pads A, so as to permit of progressively forming the welded seam as will be presently described.

In the exemplary embodiment of FIGS. 4 and 5, the additional means for filling the gap between the two main rows of pads A are provided as follows: two rows of heater pads A′ are provided inwardly of the respective main rows of pads A and are so dimensioned as to leave a narrow gap between them which is just broad enough to allow the welded seam to be formed. In the form shown the pads A′ are generally similar to the pads A but only one-half as thick as the pads A, and each pad A′, has only one of its long edges contoured for interengagement with a long edge of a pad A, while the remaining side edges of the pads A′ are made flat. Still smaller pads B are provided for filling the residual gap between the inner edges of the pads A′ so as to overlie the seam. The pads B are shown shaped as elongated parallelopipeds of square cross section and with flat sides for quick removal and insertion from and into the gap. Preferably, all the additonal pads such as A′ and B are also provided with internal heater means such as the resistors 2 mentioned in connection with the pads A, although it will be understood that the heater means may sometimes be omitted from some of the pads if desired in certain applications.

While the electric heater means incorporated in the pads of the invention may be connected up in any suitable energizing circuit, it is preferred to connect all the pads in parallel, or in a number of parallel groups, thereby facilitating replacement and minimizing the effects of damage to the resistor means in any individual pad.

In use, the heater pads are set up in the manner shown so as to cover both sides of the assembly completely and continuously all along the seam to be welded, and are supported in position by any suitable means of support, not shown, such as scaffolding, hoists, or any other appropriate supporting jig or structure. Preferably, the extent of the heated area as measured away from the seam normally thereto in each direction should be at least five timse the thickness of the work. In cases where the welded assembly to be made is a cylindrical tank or other closed structure, the entire inner and outer surfaces of the structure are desirably covered with the heater pads of the invention. It will be noted that due to the flexibility of the pads constructed as described with reference to FIGS. 1–3, the row of pads will readily conform to the curvature of such cylindrical or otherwise curved, e.g., spherical work.

With the heater pads thus placed and the electrical resistors thereof appropriately connected up with a supply, power is applied to energize said resistors to a predetermined degree so as to heat the work to a prescribed preheating temperature from both of the opposite faces of the work. After a suitable time period required to attain a thoroughly uniform temperature condition throughout the depth and surface of the work, welding operations are commenced. For this purpose as shown in FIG. 5, the central pads $B_1$, $B_2$, $B_3$ and $B_4$ are removed one by one to uncover a limited portion of the seam such as E and a weld is formed along this uncovered portion, after which the removed pad B is replaced and an adjacent pad is removed to continue the welded seam. In this way the welding process is advanced to completion while at all times maintaining prescribed temperature conditions in the work even in the regions closely adjacent to the seam portion being formed and without any discomfort to the welder, a situation it was quite impossible to achieve with conventional heating arrangements.

After the weld has been completed on each side, all the heater pads are replaced and the energizing current in the heaters is increased, e.g., to 600° C. to provide the desired annealing conditions. Alternatively the energizing current in the individual heater means may be separately controlled throughout the welding process to establish desired temperature conditions in each region as the weld progresses.

In either case a high degree of continuity in the welding process is ensured with no part of the weld being at any time allowed to cool off until the entire seam (or a desired long section thereof) has been completed.

It will be understood that the heating apparatus shown in FIGS. 4 and 5 is exemplary and that many variations may be made therein especially as regards the additional heater pad elements such as A′ and B, positioned directly adjacent the seam, with accompanying modifications in the resulting welding procedure. FIG. 6 illustrates one such modification. Here the heater pads A and A′ may be identical with those provided in the embodiment last described. However, the separate central pad elements B are omitted and instead there are provided two flexible strip-like heater elements C1 and C2. Further means are provided for progressively reeling the adjacent end portions of the two strips on and off a suitable reeling structure in such a manner as to leave at all times between the reeled end portions of the strips an uncovered region E′ in which the welding operation can be freely performed. The reeling structure may assume any suitable form and is here shown simply as a bracket having two parallel spaced arms about which the strips C1 and C2 are adapted to be simultaneously reeled off and on respectively as indicated by the arrows F1 and F2 on displacement of the support rightward as shown in the drawing.

The heating equipment for welding processes as described has been found vastly to improve working conditions and reduce fuel consumption when applied to the welding of large reactor tank structures of generally cylindrical shape and other assemblies of more or less complex shape. The quality of the resulting welds has moreover been found to be greatly superior to that obtainable with prior welding procedures. The structures especially contemplated by the invention are exposed in use to very high internal pressures so that any local defect in a welded seam, e.g., along a generatrix of the cylindrical tank structure, such as defects due to high temperature gradients established during and after welding because of non-uniform heating conditions, are liable to result in grave consequences in the subsequent operation of the structure. These defects can be completely prevented or the frequency of their occurrence very greatly reduced by using the process and equipment described owing to the near-perfect uniformity in heating conditions achieved by the invention.

What I claim is:

1. In a welding process, the steps of completely covering continuous areas on one side of the work along the seam to be welded with electric heater pads in direct contact engagement with the work surface, energizing said heater pads to preheat the work, progressively uncovering successive regions of the work along the path of the welded seam to be formed, forming successive portions of a welded seam in the uncovered region and progressively recovering said region after the formation of the seam portion therein.

2. In a welding process, the steps of completely covering continuous areas on both sides of the work along the seam to be welded with electric heater pads in direct contact engagement with the work surface, energizing said heater pads to preheat the work, progressively uncovering successive regions on one side of the work along the path of a welded seam to be formed, forming successive portions of a welded seam in the uncovered region and progressively recovering said region after formation of the seam portion therein.

3. In the process as claimed in claim 2, the feature that said continuous areas extend in each direction away from the welded seam along the surface of the work for a distance at least equal to five times the gauge thickness of the work.

4. In the process claimed in claim 2, the step of first energizing the heater pads to a first heating temperature for preheating the work, and then energizing the heater pads to a second and higher temperature for post-heating the work during the cooling of the weld.

5. In the process claimed in claim 2, the step of progressively removing successive pad elements to uncover said regions and then progressively replacing said pad elements after formation of the seam portion in each uncovered region.

6. In the process claimed in claim 2, the step of progressively reeling continuous electric heater strip means on and off the work at spaced points of the path of the seam to be welded to provide said progressively uncover successive regions between said spaced points, and further reeling said strip means to cover the region in which the weld portion was formed while uncovering a further region.

References Cited in the file of this patent
UNITED STATES PATENTS

| | | |
|---|---|---|
| 1,361,533 | Newell | Dec. 7, 1920 |
| 1,542,753 | Wiltsie | June 16, 1925 |
| 1,902,051 | Wall | Mar. 21, 1933 |
| 2,184,534 | Smith et al. | Dec. 26, 1939 |
| 2,229,405 | Currier | Jan. 21, 1941 |
| 2,873,352 | Franco | Feb. 10, 1959 |